US007978343B2

(12) United States Patent
Sun et al.

(10) Patent No.: US 7,978,343 B2
(45) Date of Patent: *Jul. 12, 2011

(54) NANOSCALE OPTICAL TOMOGRAPHY BASED ON VOLUME-SCANNING NEAR-FIELD MICROSCOPY

(75) Inventors: Jin Sun, Mountain View, CA (US); John C. Schotland, Merion, PA (US); Rainer Hillenbrand, Friedberg (DE); Paul Scott Carney, Champaign, IL (US)

(73) Assignee: The Board of Trustees of the University of Illinois, Urbana, IL (US)

( * ) Notice: Subject to any disclaimer, the term of this patent is extended or adjusted under 35 U.S.C. 154(b) by 282 days.

This patent is subject to a terminal disclaimer.

(21) Appl. No.: 12/405,449

(22) Filed: Mar. 17, 2009

(65) Prior Publication Data
US 2010/0039654 A1 Feb. 18, 2010

Related U.S. Application Data

(60) Provisional application No. 61/038,562, filed on Mar. 21, 2008.

(51) Int. Cl.
*G01B 11/24* (2006.01)
(52) U.S. Cl. ............... 356/601; 356/445; 382/154
(58) Field of Classification Search .......... 356/601–623, 356/237.1, 337, 445–448; 382/154
See application file for complete search history.

(56) References Cited

U.S. PATENT DOCUMENTS

| 5,796,909 | A | * | 8/1998 | Islam | 385/147 |
| 2002/0154301 | A1 | * | 10/2002 | Shen et al. | 356/301 |
| 2003/0039429 | A1 | * | 2/2003 | Inoue et al. | 385/12 |
| 2006/0164638 | A1 | * | 7/2006 | Narita | 356/318 |
| 2009/0276923 | A1 | * | 11/2009 | Sumetsky | 850/32 |
| 2009/0296094 | A1 | * | 12/2009 | Davis et al. | 356/445 |

FOREIGN PATENT DOCUMENTS

DE 102005029823 12/2006

OTHER PUBLICATIONS

Betzig, et al., "Near-field optics: microscopy, spectroscopy and surface modification beyond the diffraction limit," Science, vol. 257, pp. 189-195, Jul. 10, 1992.
Davis, et al., "Nonparaxial vector-field modeling of topical coherence tomography and interferometric synthetic aperture microscopy," J. Opt. Soc. Am. A, vol. 24, No. 9, pp. 2527-2542, Sep. 2007.

(Continued)

*Primary Examiner* — Hoa Q Pham
(74) *Attorney, Agent, or Firm* — Sunstein Kann Murphy & Timbers LLP

(57) ABSTRACT

An apparatus and methods for nanoscale optical tomography based on back-scattering mode near-field scanning optical microscopy with a volumetric scan of the probe. The back-scattered data collected by a volumetric scan of the probe contains three-dimensional structural information of the sample, which enables reconstruction of the dielectric sample without other mechanical movements of the instrument.

8 Claims, 4 Drawing Sheets

OTHER PUBLICATIONS

Hillenbrand, et al., *"Complex optical constants on a subwavelength scale,"* Phys & Rev. Lett., vol. 85, pp. 3029-3032, Oct. 2, 2000.

Sun, et al., *"Near-field scanning optical tomography: a nondestructive method for three-dimensional nanoscale imaging,"* IEEE J. Sel Top. In Quant. Electronics, vol. 12, pp. 1072-1082, Nov./Dec. 2006.

Sun, et al., *"Strong tips in near-field scanning optical tomography,"* Journal of Applied Physics vol. 102, 103103, 2007.

Vogelsgang, et al., *"Beyond lock-in analysis for volumetric imaging in apertureless scanning near-field optical microscopy"* J. Microscopy, vol. 229, Pt. 2, pp. 365-370, 2008.

* cited by examiner

NANOSCALE OPTICAL TOMOGRAPHY BASED ON VOLUME-SCANNING NEAR-FIELD MICROSCOPY

The present application claims the priority of U.S. Provisional Patent Application Ser. No. 61/038,562, filed Mar. 21, 2008, and incorporated herein by reference.

This invention was developed with Government support under AFOSR Grant No. FA9550-07-1-0096 and MURI Grant No. F49620-03-10379, awarded by the U.S. Air Force, and under CAREER Award Grant No. 0239265 and DMR 0425780, both awarded by the National Science Foundation. The Government has certain rights in the invention.

TECHNICAL FIELD OF THE INVENTION

The present invention pertains to methods and apparatus for imaging in three dimensions with a resolution exceeding that corresponding to the wavelength of illuminating radiation.

BACKGROUND OF THE INVENTION

Near-field scanning optical microscopy (NSOM), as a surface imaging technology, has found its way into numerous applications including semiconductor and biological sample imaging, due to its subwavelength resolution that transcends the Rayleigh diffraction limit. A description may be found, for example, in Betzig et al., "*Near-field optics: microscopy, spectroscopy, and surface modification beyond the diffraction limit,*" *Science*, vol. 257, pp. 189-95, (1992), which is hereby incorporated by reference.

Unless the context requires otherwise, the term "near field," as used herein and in any appended claims, substantively or adjectivally, refers to a regime in which evanescent (exponentially decaying) components of a scattering wave-function are significant. Other regions of the field, more distant from the defining aperture, are referred to herein as the "far field."

Conventional NSOM takes the scattered optical intensity above a three-dimensional sample as a two-dimensional image of the sample. This interpretation of NSOM data suffers from ambiguity between variations in the topology and optical properties of the sample. Several works have addressed this ambiguity and the solution of a three-dimensional near-field inverse scattering problem (ISP) which makes possible three-dimensional tomographic imaging. The resulting methods are known as near-field scanning optical tomography (NSOT). Detailed discussion may be found in Sun et al., "*Near field scanning optical tomography: a nondestructive method for three-dimensional nanoscale imaging,*" IEEE J. Sel. Top. in Quant. Electronics, vol. 12, pp. 1072-82, (2006), and in Sun et al., "*Strong tip effects in near-field scanning optical tomograpy,*" Jour. Appl. Phys., vol. 102, 103103, (2007), both of which references are incorporated herein by reference.

It is to be understood that the term "aperture," as used herein and in any appended claims, does not require an actual physical aperture, and that a sharp metal tip, for example, may serve as a pointlike secondary source that illuminates the sample and serves the function of an aperture for purposes of the present treatment, and is considered to be subsumed within the term "aperture" for current purposes. The "aperture" may be the facet of an optical fiber, possibly sharpened to reduce its characteristic dimension. Further discussion of the aperture may be found in Sun et al. (2007). Furthermore, unless the context otherwise requires, the term "near field," as used herein and in any appended claims, substantively or adjectivally, shall have the meaning of a regime in which evanescent components of a scattering wavefunction are significant. Other regions of the field, more distant from the defining aperture, are referred to herein as the "far field."

Current NSOT modalities require multi-directional measurements of the scattered field in illumination mode, or multi-angle illuminations in collection mode. Discussion of these modalities may be found in Sun (2006) and (2007). The requirements of multi-directional measurements in current NSOT modalities inevitably complicate NSOM experimental configurations. A simple way of obtaining more data with only minor changes of current experiments is to scan the probe over a three-dimensional volume above the sample, as described by Hillenbrand et al., "*Complex optical constants on a subwavelength scale,*" Phys. Rev. Lett., vol. 85, pp. 3029-32, (2000), incorporated herein by reference, which amounts to acquiring multiple NSOM images at different distances from the sample. Scanning a probe in three dimensions is discussed, as well, in Vogelsgang et al, "*Beyond lock-in analysis for volumetric imaging in apertureless scanning near-field optical microscopy*", *J. Microscopy*, vol. 229, pt. 2, pp. 365-70, (2008), and in German Patent Application DE 10 2005 029 823.0, to Taubner et al., published Dec. 28, 2006, both of which references are incorporated herein by reference. In illumination or collection mode NSOM, such data sets are related by propagation or back-propagation of the scattered field, and are therefore considered redundant. See, Born & Wolf, *Principles of Optics*, 6th ed. (1980), reprinted (1997), which is incorporated herein by reference.

SUMMARY OF THE INVENTION

In accordance with preferred embodiments of the present invention, an apparatus is provided for three-dimensional imaging an object. The apparatus has a light source for illuminating the object with an illuminating electromagnetic wave via an illumination path, and a detector for detecting electromagnetic waves scattered by the object via a collection path. Within at least one of the illuminating path and the collection path, the apparatus has an "aperture," wherein the aperture is characterized by a dimension equal to, or smaller than, a characteristic wavelength of the illuminating electromagnetic wave. The aperture is defined such that it may be a probe tip subject to the same dimensional condition. The apparatus also has a scanner for scanning a relative position of the aperture with respect to the object to a plurality of relative positions, not all of which relative positions are coplanar, above the surface of the object. Finally, the apparatus has a controller adapted
  i. to apply a forward model of a point scatterer in a manner as to derive a three dimensional scattering model;
  ii. to receive the detector signal and generate a detected data function; and
  iii. to invert the detected data function in terms of the forward model to obtain a three-dimensional reconstruction of the object.

In accordance with embodiments of another aspect of the present invention, methods are provided for imaging an object. The methods have steps of:
  a. illuminating the object with an illuminating electromagnetic wave via an illumination path;
  b. detecting, with a detector disposed in a far field, electromagnetic waves scattered by the object via a collection path, wherein an aperture, disposed within at least one of the
      illumination path and the collection path, is equal to,
      or smaller than, a characteristic wavelength of the
      electromagnetic wave;
   c. scanning the aperture to a plurality of positions, not all of
      which positions are coplanar, above the surface of the
      object;
   d. applying a forward model of a point scatterer in a manner
      as to derive a three dimensional scattering model; and
   e. inverting a detected data function in terms of the forward
      model to obtain a three-dimensional reconstruction of
      the object.

In accordance with alternate embodiments of the invention, the forward model may be expressed in terms of a block-diagonalized forward integral equation. The step of scanning the aperture may include scanning a position of a probe tip that is small on a scale of the characterizing wavelength of the illuminating electromagnetic wave.

DESCRIPTION OF THE FIGURES

The foregoing features of the invention will be more readily understood by reference to the following detailed description, taken with reference to the accompanying drawings, in which:

FIG. 4(a) represents the original sample object for purposes of the numerical simulations, while FIG. 4(b) shows reconstructions for three different levels of SNR, both in the vertical xz plane and three transverse layers parallel to the xy plane in which the three point scatterers are located, respectively.

DESCRIPTION OF SPECIFIC EMBODIMENTS OF THE INVENTION

In accordance with the backscattered mode of preferred embodiments of the present invention, as now described, data sets collected at different distances may be shown to be independent, and may be used to obtain three-dimensional information of the sample. This method will be referred to herein as volume-scanning near-field optical tomography. The Description of Specific Embodiments is organized as follows. First, the forward problem for an apertured probe tip is described in detail. A weakly scattering sample is assumed and the first Born approximation is utilized to linearize the forward problem. Then, a solution to the image reconstruction problem based on the pseudoinverse of the forward operator is developed. Finally, numerical simulations illustrating the theory are presented.

Forward Problem

Figure 1:
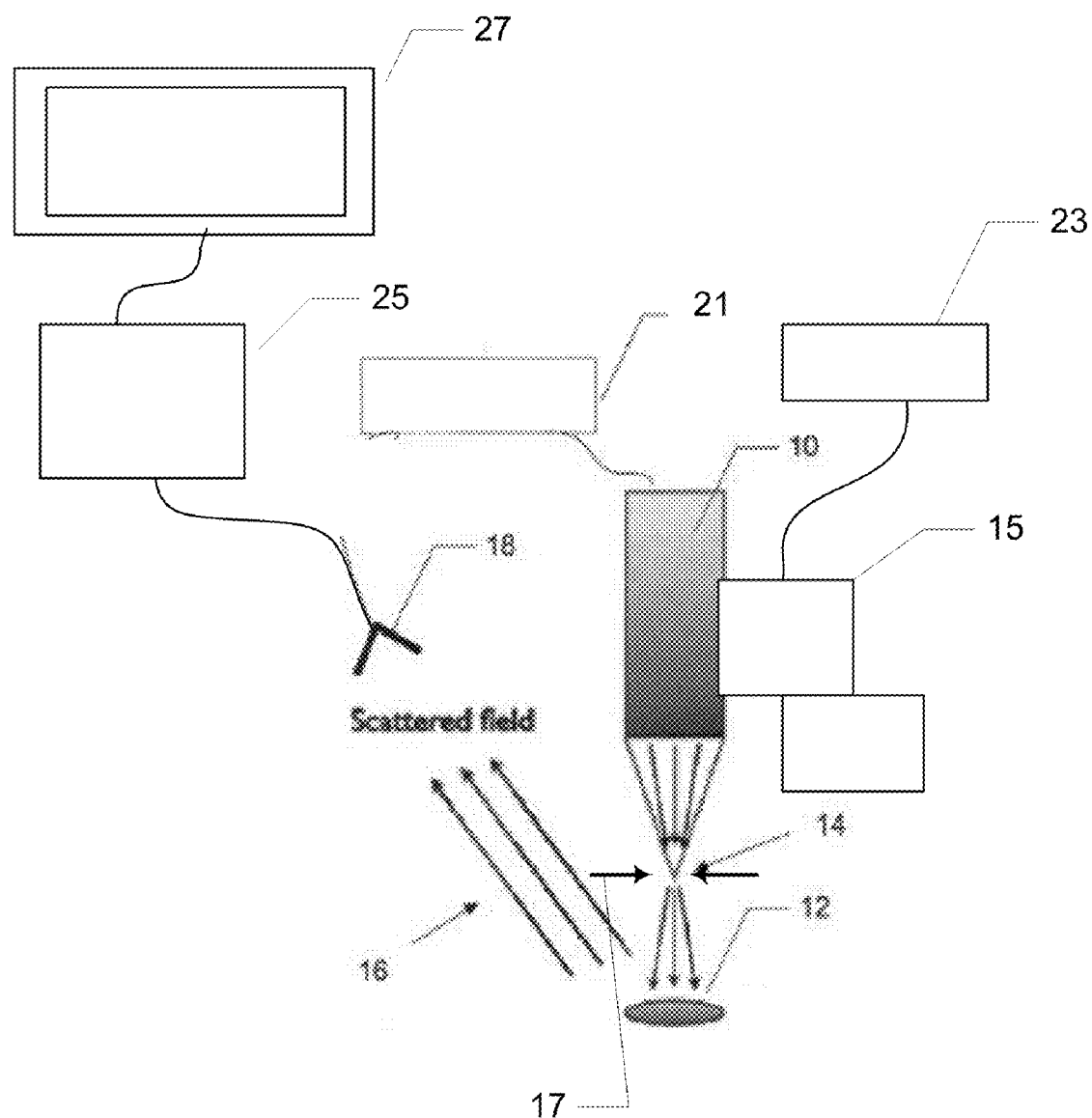
FIG. 1 is a schematic depiction of an implementation of a sub-wavelength near-field imaging system in accordance with an embodiment of the present invention.
Figure 3:
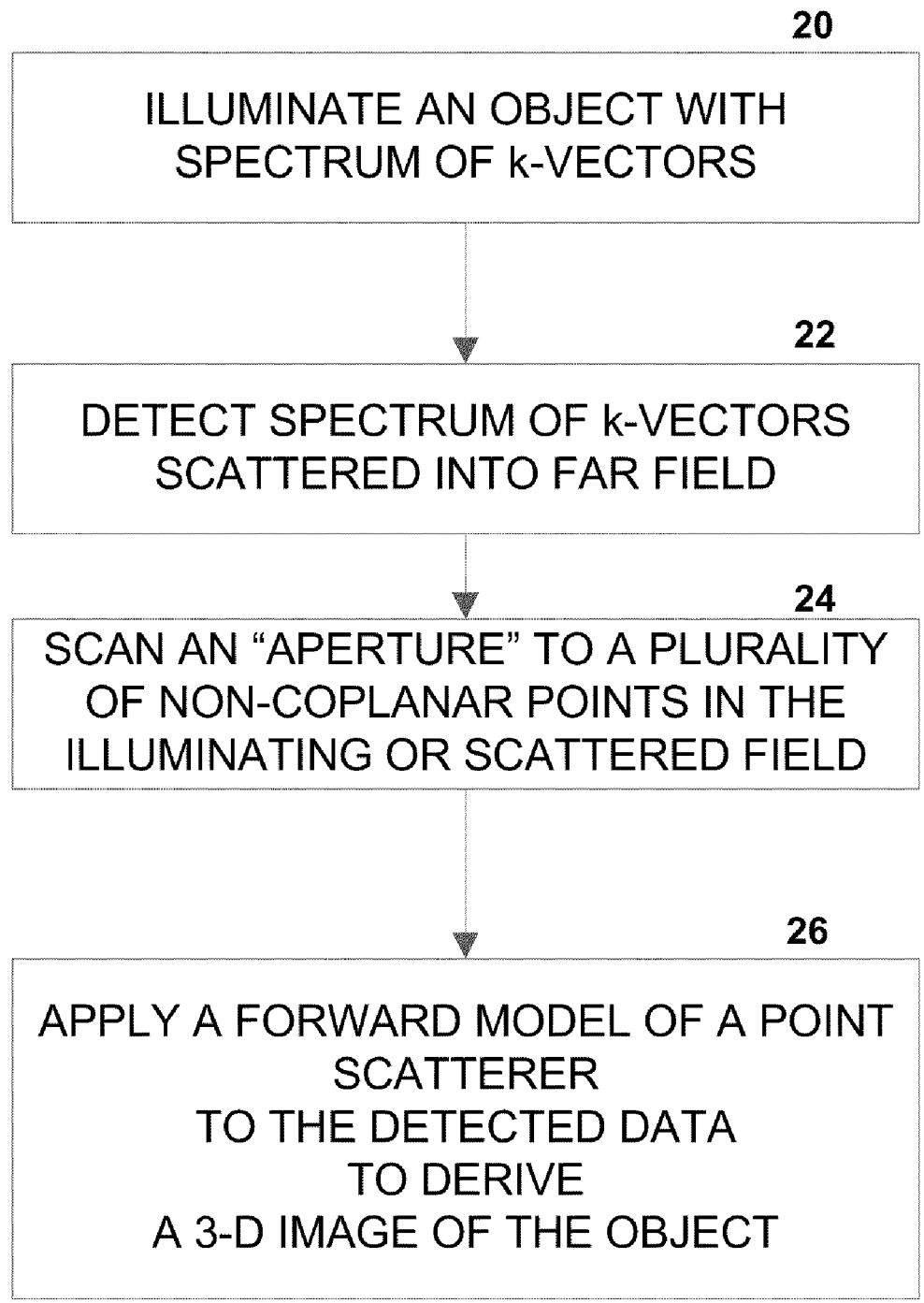
FIG. 3 is a flow chart depicting process steps for sub-wavelength imaging in accordance with embodiments of the present invention.

For purposes of the present description of the invention, a weakly scattering, isotropic sample, described by the dielectric susceptibility $\eta(r)$, is placed in vacuum above a half-space with a uniform index of refraction n. The interface is taken to be the z=0 plane. An apertured probe tip placed closely above the sample serves as a monochromatic point-like source that illuminates the sample. Refering to FIG. 1, light of an illumination source 10 illuminates object 12. Object 12 is located in the near field of an aperture 14, which may be an actual aperture or a probe region, small on the scale of the pertinent wavelength, from which the incident beam is reflected or scattered. Aperture (or tip) 14 is situated such that object 12 lies within the near field of light emanating from the aperture. Aperture 14 is characterized by a characteristic dimension, such as a diameter 17, for example. More particularly, aperture 14 may be characterized by a dimension equal to, or smaller than, a characteristic wavelenth of the illuminating electromagnetic wave. The path from illuminating source 10 to object 12 may be referred to as the "illumination path." Illumination source 10 may be characterized by a tunable wavelength. The illumination step is designated by numeral 20 in FIG. 3.

Figure 2:
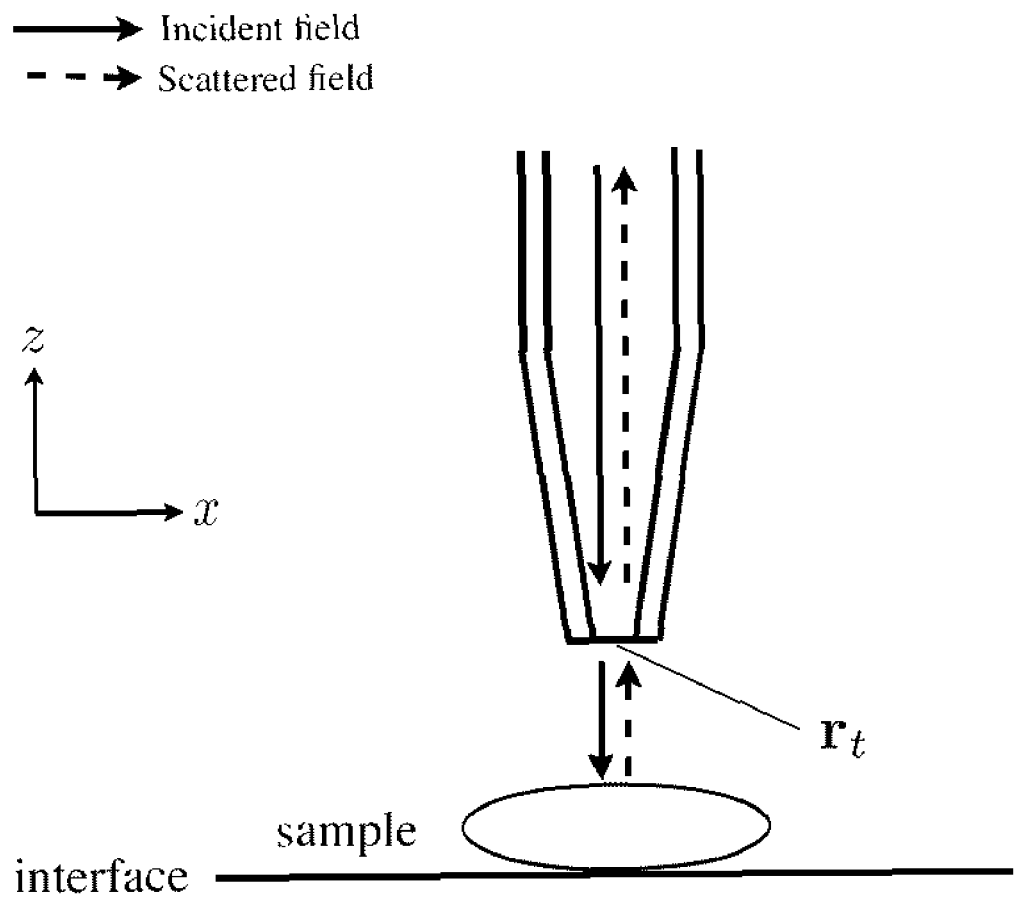
FIG. 2 shows an apertured tip for a sub-wavelength near-field imaging system in accordance with an embodiment of the present invention.

Light 16 scattered from the object is detected by one or more detectors 18 disposed in the far field with respect to the light from aperture 14 that is scattered by object 12. The path from object 12 to detector 18 may be referred to as the "collection path," and the detection step is designated by numeral 22 in FIG. 3. Scanner 15 scans the relative position of aperture 14 with respect to object 12 both in one or more directions substantially parallel to the surface of object 12 and also in a direction toward, or away from, object 12. Scanner 15 may be a micropositioner, or any suitable actuator known in the art. Thus, the illumination intercepts successive regions of object 12. The scanning step is designated by numeral 24 in FIG. 3. Controller 21 governs operation of source 10, and may scan the wavelength of the source, and receives a signal from detector 18 for processing, as described herein. Controller 23, which may be the same as controller 21, governs the relative position of aperture 14 with respect to object 12. The backscattered field may be collected by the same tip 14, as is shown in FIG. 2, or using another aperture. The tip is scanned in a three-dimensional volume above the sample. It is to be understood that, within the scope of the present invention, either aperture 14 or object 12, or both, may be scanned.

Controller 25, in a manner described in detail below, applies a forward model of a point scatterer to the detected data to derive a three-dimensional image of object 12, which three-dimensional image may be stored in the memory of controller 25 and may subsequently be displayed on display device 27, or otherwise processed. One or more of controllers 21, 23, and 25 may be collocated within the scope of the present invention, and may share processing resources.

In constructing the forward scattering model, a point-like source of illumination is modeled as a small electric dipole $p_1$ located at the tip position $r_t=(\rho_t, z_t)$. The incident field, i.e., the dipole field, is given by $$E_i(r)=k_0^2 G(r,r_t) p_1, \qquad (1)$$

where $k_0$ is the free-space wave number, and G is the half-space Green's tensor, which is given by the plane wave representation as $$G(r, r') = \frac{i}{2\pi} \int d^2 q g(z, z'; q) \exp[iq \cdot (\rho - \rho')], \qquad (2)$$

where $r=(\rho, z)$, $r'=(\rho', z')$, and the quantity $g(z, z'; q)$ is given in Sun et al. (2007).

The field scattered from the sample, under the first Born approximation, is given by $$E_s(r)=k_0^2 \int d^3 r' G(r,r') \eta(r') E_i(r'). \qquad (3)$$

Substituting Eq. (1) into Eq. (3), the scattered field, collected by the tip at $r_t$ at polarization $p_2$, is seen to be $$E_s(r_t) = k_0^4 \int d^3r' p_2 \cdot G(r_t, r') G(r', r_t) p_1 \eta(r'). \tag{4}$$

Note that $E_s(r_t)$ is the $p_2$ polarization component of $E_s(r_t)$. Equation (4) solves the forward problem of relating the three-dimensional sample $\eta$ to the three-dimensional distribution of the measured quantity $E_s$ over the scanning volume of the tip.

It can be seen from the preceding analysis that the scan of the tip changes not only the illumination but also the detector position. Changes of angle of illumination or collection by rotation of light source or field detector in previous NSOT modalities are eliminated, advantageously leading to a considerable simplification. A necessary degree of freedom in the data is retrieved by scanning in the depth dimension. Inversion of Eq. (4) is seen to be possible by noting that the kernel of integration consists of the product of a pair of reciprocal Green's functions, which, when seen in the spatial frequency domain, is supported on a three-dimensional domain. As a result, the measured quantity $E_s$, as image of the sample function $\eta$ by the mapping defined by Eq. (4), is genuinely three-dimensional, as is in contrast to the data collected by modalities discussed in previous works with a given illumination or collection angle, which is inherently two-dimensional due to propagation relationships between different layers of field distribution, or equivalently, to the rank-deficiency of the Green's function as a kernel of integration. The ISP amounts to inversion of Eq. (4), which is considered below.

In the forward analysis, performed by controller the tip is modeled as a point-like dipole as a source of illumination and a point-like polarized detector when collecting the back-scattered field, as in Novotny et al., *Principles of Nano-Optics*, 1st ed., Cambridge University Press (2006). It is noted that such modeling is by no means restrictive or exclusive. Other models, such as an extended dipole model or a magnetic dipole, may be used in a similar manner without changing the nature of the inverse problem.

Inverse Problem

To solve the ISP, the data function $\Phi(q_t, z_t)$ is first defined as a two-dimensional lattice Fourier transform of $E_s(r_t)$ with respect to $\rho_t$, with sample spacing h:

$$\Phi(q_t, z_t) = h^2 \sum_{\rho_t} E_s(r_t, z_t) e^{-iq_t \cdot \rho_t}, \tag{5}$$

where the sum over $\rho_t$ is carried out over all lattice vectors and $q_t$ belongs to the first Brillouin zone (FBZ) of the lattice. In this case $$FBZ = \left[-\frac{\pi}{h}, \frac{\pi}{h}\right] \times \left[-\frac{\pi}{h}, \frac{\pi}{h}\right].$$

By substituting Eq. (4) into Eq. (5) and making use of Eq. (2), the plane wave representation of the Green's tensor, and the identity $$\sum_{\rho} e^{iq \cdot \rho} = \left(\frac{2\pi}{h}\right)^2 \sum_{q''} \delta(q - q''), \tag{6}$$

where q" denotes a reciprocal lattice vector, the data function is found to be $$\Phi(q_t, z_t) = -k_0^4 \sum_{q''} \int dz' \int d^2q p_2 \cdot q(z_t, z', q) g(z', z_t, q - q_t - q'') \tag{7}$$

$$p_1 \tilde{\eta}(q_t + q'', z'),$$

and where $\tilde{\eta}$ is the transverse Fourier transform of the sample function $\eta(r) = \eta(\rho, z)$, $$\tilde{\eta}(q, z) = \int d^2 \rho \eta(\rho, z) e^{-iq \cdot \rho}. \tag{8}$$

Assuming that the sample function is bandlimited to the FBZ, the sum over the reciprocal lattice vector q" in Eq. (7) may be truncated, leaving only the zeroth term. Thus the data function becomes $$\Phi(q_t, z_t) = \int dz' K(z_t, z', q_t) \tilde{\eta}(q_t, z'), \tag{9}$$

where the kernel K is given by $$K(z_t, z', q_t) = -k_0^4 \int d^2q \, p_2 \cdot g(z, z', q) g(z', z_t, q - q_t) p_1. \tag{10}$$

Equation (9) is the block-diagonalized form of Eq. (4). The block-diagonalization reduces the three-dimensional integral equation to a series of one dimensional integral equations labeled by $q_t$.

For each $q_t$, the integral operator K defined in Eq. (9) maps an object function $\tilde{\eta}$ in the object space $H_1$, which is infinite dimensional, into a data function $\Phi$ in the data space $H_2$, which is finite dimensional. In light of this observation, an inverse of K may not exist. Instead we seek the minimum-norm least-square solution to Eq. (9), which is given by the pseudoinverse operator of K as $$\tilde{\eta}^+(q_t, z') = \sum_{z_t} K^+(z', z_t, q_t) \Phi(q_t, z_t), \tag{11}$$

where $K^+$ is the pseudoinverse of K, given by the $$K^+ = K^*(KK^*)^+, \tag{12}$$

where $K^*$ is the adjoint of K, and $(KK^*)^+$ is the matrix pseudoinverse of the finite-dimensional Gram matrix $KK^*$. The elements of the Gram matrix may be computed as $$KK^*(z_t, z'_t, q_t) = \int_0^{z_m} dz' K(z_t, z', q_t) K^*(z', z'_t, q_t), \tag{13}$$

where $z_m$ is the maximum height of the sample. The Gram matrix is generally ill-conditioned and regularization such as truncated singular value decomposition (TSVD) is necessary in order to obtain a stable solution to the inverse problem. A reconstruction of the sample function $\eta$ may be obtained by taking the inverse Fourier transform of $\tilde{\eta}^+$.

Numerical Simulation

Figure 4:
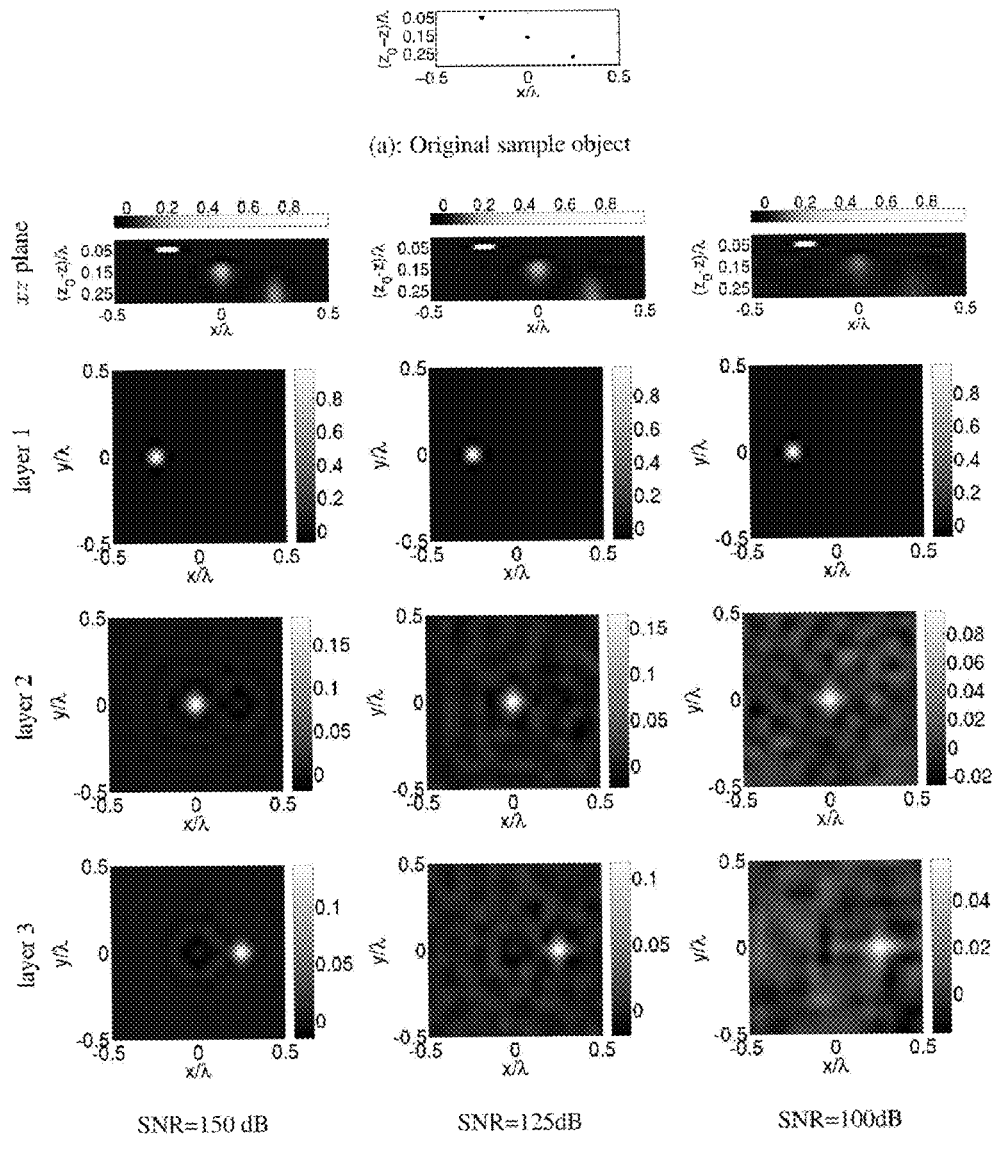

A series of numerical simulations were conducted to demonstrate the method developed in the foregoing description of the Inverse Problem. In the simulations, a sample object consisting of three-point-like scatterers with unit and isotropic polarizability located in the y=0 plane above the interface is assumed, as is shown in FIG. 4(a). The index of refraction of the lower half space is set to be 1.5. A tip is initially located in the $z_0 = 0.32\lambda$ plane, where $\lambda = 2\pi/k_0$ is the free-space wavelength. The tip is assumed to be polarized in the z direction in both illumination and collection ($p_1=p_2=\hat{z}$). The tip is scanned in the transverse and depth directions. The scanned range in the depth z direction is from the initial $0.32\lambda$ to $0.63\lambda$ with a spacing of $0.008\lambda$. The transverse scan range is set to be large enough to include any significant signal, and the scan spacing is $0.063\lambda$.

Forward scattering data are simulated and contaminated with white Gaussian noise at three different levels of signal-to-noise ratio (SNR): 150 dB (decibel), 125 dB and 100 dB. Pseudo-inverse solutions are constructed using the method described above. The regularization used is TSVD, where regularization parameters are chosen to suppress noise effects. The reconstructions of the sample are shown in FIG. 4(b). In these reconstructions, subwavelength resolution in the transverse direction and depth resolution up to $\sim\lambda/3$ may be observed. Depth resolution is very good near the measurement volume, and deteriorates as distance to the measurement volume is increased, due to the prior knowledge that the sample is restricted beneath the measurement volume, which is built in the inverse algorithm. The transverse resolution is reduced with depth as well as noise level increment, which arises the exponential decay of evanescent waves containing high-frequency information with distance. Noise resistance of the inversion is relatively low, as is seen from the noticeable decrease of reconstruction quality with relatively low noise level. This is the reflection of the fact that the inverse problem is extremely ill-posed.

The modality described above makes use of a dual-purpose apertured tip scanning in three dimensions, advantageously allowing sufficient degrees of freedom in the raw data without multiple-angle illumination or detection. This new method simplifies the realization of near-field optical tomography, which has potential applications such as depth resolved near-field microscopy for three-dimensional mapping of layered surface structures, noninvasive optical method for measuring thin surface layer thickness with nanoscale lateral resolution, mapping buried objects or subsurface imaging, etc.

It is to be understood that the invention may be embodied in any number of instrument modalities, such as illuminating-probe, collecting-probe, multiple probes, etc., all within the scope of the invention. Moreover, it is to be understood that the "aperture" or "probe" may be more complex than a single point, and that the extension to a more complex analysis is within the scope of the present invention. Furthermore, in alternative embodiments, the disclosed methods of near-field imaging may be implemented as a computer program product for use with a computer system. Such implementations may include a series of computer instructions fixed either on a tangible medium, such as a computer readable medium (e.g., a diskette, CD-ROM, ROM, or fixed disk) or transmittable to a computer system, via a modem or other interface device, such as a communications adapter connected to a network over a medium. The medium may be either a tangible medium (e.g., optical or analog communications lines) or a medium implemented with wireless techniques (e.g., microwave, infrared or other transmission techniques). The series of computer instructions embodies all or part of the functionality previously described herein with respect to the system. Those skilled in the art should appreciate that such computer instructions can be written in a number of programming languages for use with many computer architectures or operating systems. Furthermore, such instructions may be stored in any memory device, such as semiconductor, magnetic, optical or other memory devices, and may be transmitted using any communications technology, such as optical, infrared, microwave, or other trans-mission technologies. It is expected that such a computer program product may be distributed as a removable medium with accompanying printed or electronic documentation (e.g., shrink wrapped software), preloaded with a computer system (e.g., on system ROM or fixed disk), or distributed from a server or electronic bulletin board over the network (e.g., the Internet or World Wide Web). Of course, some embodiments of the invention may be implemented as a combination of both software (e.g., a computer program product) and hardware. Still other embodiments of the invention are implemented as entirely hardware, or entirely software (e.g., a computer program product). All such variations and modifications are within the scope of the present invention as defined in any appended claims.

We claim:

1. An apparatus for imaging an object characterized by a surface, the apparatus comprising:
    a. a light source for illuminating the object with an illuminating electromagnetic wave via an illumination path;
    b. a detector for detecting electromagnetic waves scattered by the object via a collection path, and for generating a detector signal,
    c. an aperture, disposed within at least one of the illuminating path and the collection path, wherein the aperture is characterized by a dimension equal to, or smaller than, a characteristic wavelenth of the illuminating electromagnetic wave;
    d. a scanner for scanning a relative position of the aperture with respect to the object to a plurality of relative positions, not all of which relative positions are coplanar, above the surface of the object; and
    e. a controller adapted
        i. to apply a forward model of a point scatterer in a manner as to derive a three dimensional scattering model;
        ii. to receive the detector signal and generate a detected data function; and
        iii. to invert the detected data function in terms of the forward model to obtain a three-dimensional reconstruction of the object.

2. An apparatus in accordance with claim 1, wherein the aperture is disposed in the illumination path.

3. An apparatus in accordance with claim 1, wherein the aperture is a probe tip.

4. An apparatus in accordance with claim 1, wherein a single aperture lies in both the illumination and the collection path.

5. An apparatus in accordance with claim 1, wherein the light source is tunable in wavelength.

6. A method for imaging an object characterized by a surface, the method comprising:
    a. illuminating the object with an illuminating electromagnetic wave via an illumination path;
    b. detecting, with a detector disposed in a far field, electromagnetic waves scattered by the object via a collection path,
        wherein an aperture, disposed within at least one of the illumination path and the collection path, is equal to, or smaller than, a characteristic wavelength of the electromagnetic wave;
    c. scanning a relative position of the aperture with respect to the object to a plurality of positions, not all of which positions are coplanar, above the surface of the object;

d. applying a forward model of a point scatterer in a manner as to derive a three dimensional scattering model; and
e. inverting a detected data function in terms of the forward model to obtain a three-dimensional reconstruction of the object.

7. A method in accordance with claim 6, wherein the step of scanning the aperture includes scanning a position of a probe tip that is small on a scale of the characterizing wavelength of the illuminating electromagnetic wave.

8. A method in accordance with claim 6, wherein the forward model is expressed in terms of a block-diagonalized forward integral equation.

* * * * *

UNITED STATES PATENT AND TRADEMARK OFFICE
CERTIFICATE OF CORRECTION

PATENT NO. : 7,978,343 B2
APPLICATION NO. : 12/405449
DATED : July 12, 2011
INVENTOR(S) : Sun et al.

Page 1 of 1

It is certified that error appears in the above-identified patent and that said Letters Patent is hereby corrected as shown below:

In Column 8, Line 30

Replace, "wavelenth"
With, "wavelength"

Signed and Sealed this
Twentieth Day of December, 2011

David J. Kappos
*Director of the United States Patent and Trademark Office*